R. C. RUSSELL.
APPARATUS FOR TRANSFERRING BAGGAGE.
APPLICATION FILED FEB. 25, 1918.
1,287,759.
Patented Dec. 17, 1918.
3 SHEETS—SHEET 1.
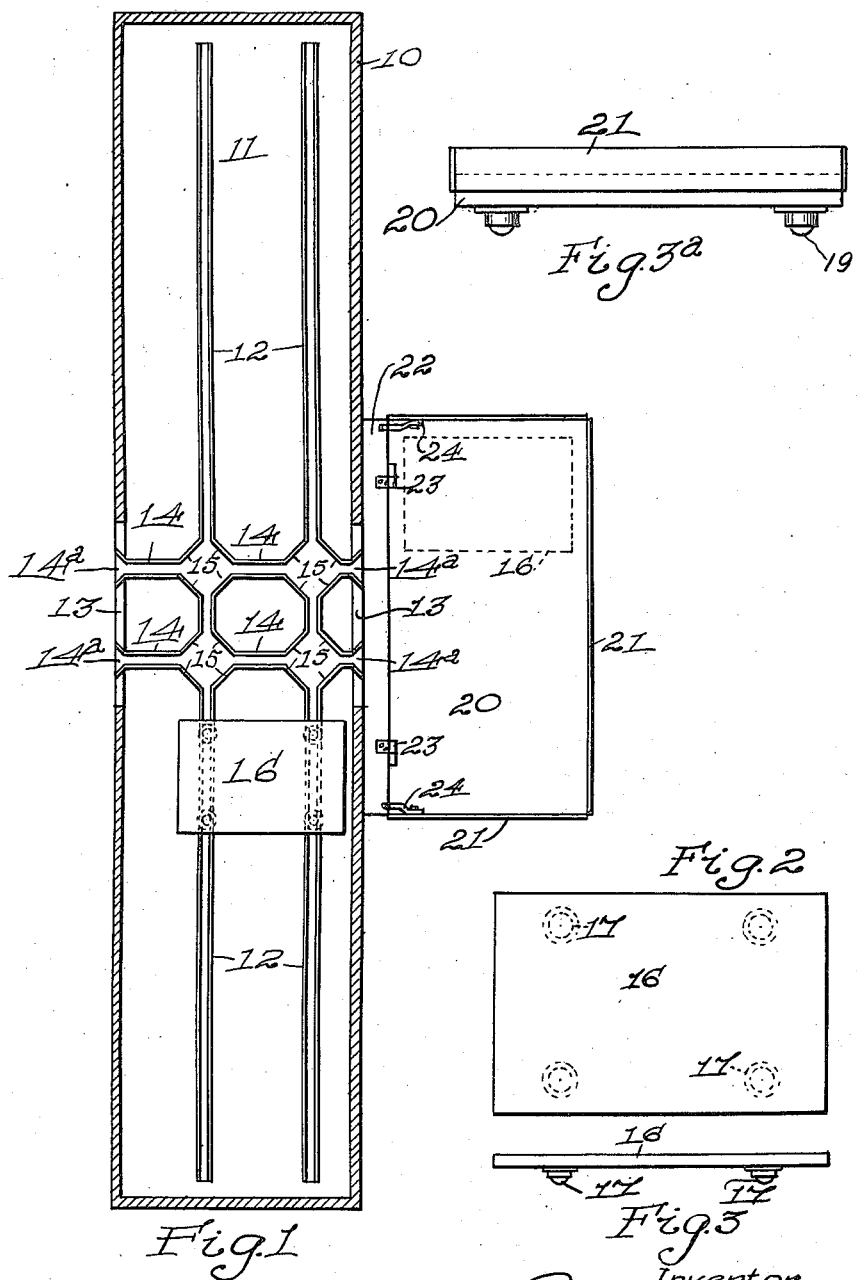

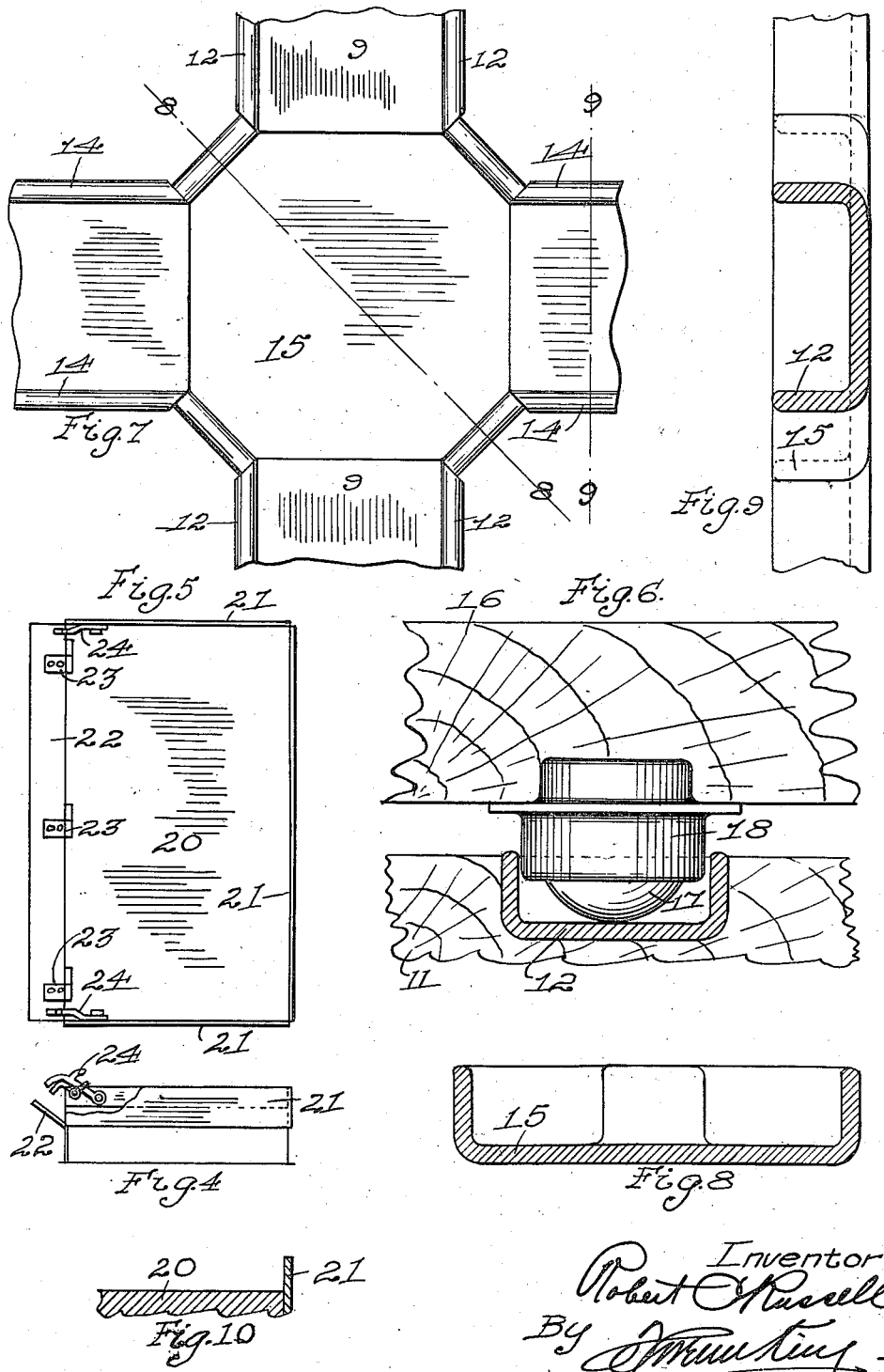

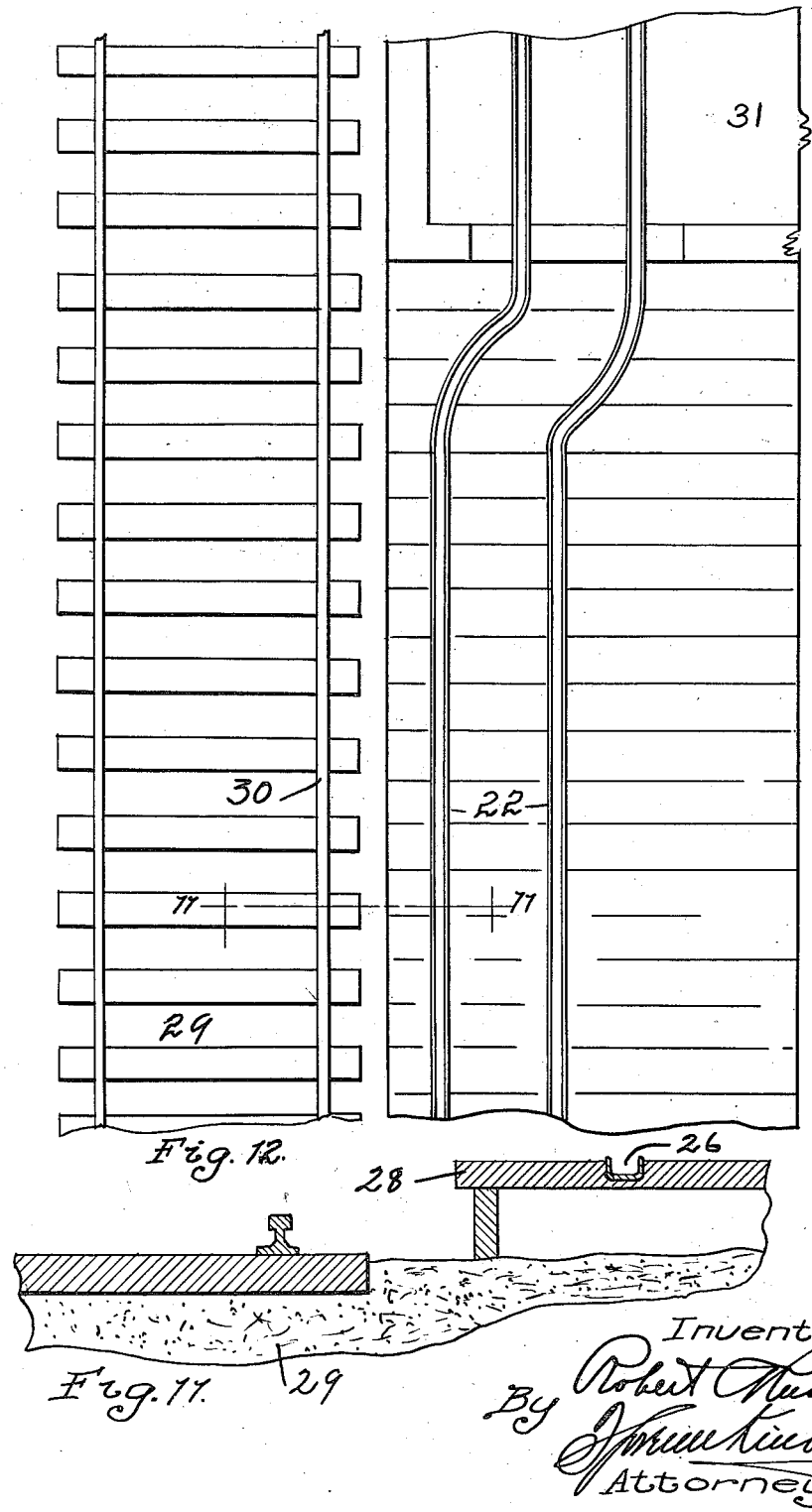

UNITED STATES PATENT OFFICE.

ROBERT C. RUSSELL, OF INDEPENDENCE, MISSOURI, ASSIGNOR OF ONE-THIRD TO DUNCAN A. McKEITH, OF BROWN CITY, MICHIGAN.

APPARATUS FOR TRANSFERRING BAGGAGE.

1,287,759.  Specification of Letters Patent.  Patented Dec. 17, 1918.

Application filed February 25, 1918. Serial No. 219,084.

*To all whom it may concern:*

Be it known that I, ROBERT C. RUSSELL, a citizen of the United States, residing at Independence, Jackson county, State of Missouri, have invented certain new and useful Improvements in Apparatus for Transferring Baggage, of which the following, taken in connection with the drawings, is a description.

My invention has for its object the production of means to facilitate the loading and unloading of baggage, express, mail, or packages of any kind being transported on cars from one station to another and permitting the same to be handled in less time at the receiving and delivery stations than is possible by the methods at present employed.

A further object of my invention is to provide means whereby all of the baggage or other packages to be received or discharged at an intermediate station on any railroad line, may be loaded on the car with a single operation and discharged therefrom in a single operation. As is well known, the present method of transferring baggage at any intermediate station usually requires more time than is necessary for the transfer of passengers, or for taking on water, coal, etc. Ordinarily, each piece of baggage is handled separately at each station, and as it is impossible to calculate at any time the amount of baggage to be handled at any station, it seriously interferes with the schedule time on which the train is running, causing great inconvenience along the entire line.

By the use of my transfer apparatus, it is possible to arrange all baggage to be transferred at an intermediate station upon a truck, which is movable from end to end of the baggage car, the attendant having all baggage to be discharged at a given station ready to be pushed out of the car on a truck as soon as the train stops. The baggage man at the station has loaded all of the outgoing baggage on a truck which is exchanged for the truck discharged from the car which is ready to be pushed into the baggage car in place of the discharged truck. The entire time consumed in making the transfer being less than is necessary to discharge and receive passengers, thereby permits all trains to run on schedule time so far as delays in the handling of baggage are concerned.

To accomplish this result, I provide trucks which are movable lengthwise and transversely of the car to enable the baggage man to utilize the same in a minimum time and combine therewith a movable platform track which will register with the track at the discharge door of the car at each station.

In the accompanying drawings I have illustrated what I now consider the preferred form of carrying out my invention, although I do not desire to be limited to the precise details of the same as here shown, contemplating such changes as may come within the scope of my claims, and in these drawings, Figure 1 is a plan view of a car floor with tracks or guideways arranged therein and a platform truck adjacent thereto;

Fig. 2 is a top plan view of the movable car truck;

Fig. 3 is an end view of the same;

Fig. 3ª is an end view of the platform truck;

Fig. 4 is an enlarged detail in side elevation of said truck;

Fig. 5 is a plan view of the same;

Fig. 6 is an enlarged detail view of the ball caster used on the movable truck, and a sectional view of the track or guideway in which it moves;

Fig. 7 is an enlarged top plan view of the switch frog plate;

Fig. 8 is a view taken on line 8—8 of Fig. 7; and

Fig. 9 is a view taken on line 9—9 of Fig. 7.

Fig. 10 is a detail sectional view of the truck.

Fig. 11 is an enlarged detail taken on line 11—11 of Fig. 10.

Fig. 12 is a top plan view of a section of railroad track and a section of a platform track in proximity thereto.

Referring to the drawings, 10 represents the walls of an ordinary baggage car, and 11 the floor thereof. Arranged upon the floor, or countersunk therein is a track or guideway 12, extending longitudinally from end to end of the car.

13—13 represent the doors on either side of the car through which the baggage or packages on the truck may be discharged. Extending transversely of the car between the doorways 13—13 are corresponding tracks or guideways, 14—14, having connection with the longitudinal tracks, 12—12, and being connected at the intersections thereof by a plurality of switch frog plates, 15. These switches are arranged to permit a truck moving on the track 12 from either end of the car, to be brought between the doors, 13—13, and without delay moved at right angles to its line of travel from end to end of the car and discharged at either side of the car through one or the other of the doors, 13.

Across the threshold of the doors 13, I have provided a Y, 14ª, extending from each track 14, and opening toward the outside of the car to facilitate the movement of the truck from the outside into the car, as hereinafter explained.

16 is a suitable truck which may have either a platform top, or may be arranged in the form of a crate, for receiving baggage or packages of any kind to be discharged from the car. This truck, 16, may have its platform arranged at whatever height above the track 12 is found to be convenient for the handling of baggage. Arranged preferably near the four corners of said truck, 16, are suitable casters or rollers, 17, held in socket frames, 18, which are attached to the bottom of the truck in any desired manner to provide means for moving the truck in the tracks or guideways, 12. This type of ball caster readily lends itself to the operation required in the movement of the trucks in any direction, and permits the trucks to travel longitudinally of the car to the frog plate switches, 15, where they are pushed out of the car in a direction at right angles to the line of travel in the car.

Combined with the construction just described, I provide a truck at each station platform, which is large enough to receive one or more of the trucks 16. This truck is preferably mounted on casters 19, or they may be casters of the type shown in Fig. 6, either of which may be of any well known form of construction. The truck platform is preferably provided with a ledge 21, extending around three sides thereof. On the fourth side, which in use will be the side next to the car, I provide a movable shelf, 22, which is hinged at 23, or otherwise secured to the platform of the truck 20. At each end thereof I provide a pivot latch 24, which can be manually operated so as to positively lock said shelf in raised position. This lift or movable ledge 22 will be used in cases where the platform truck 20 is not as high as the floor of the car, or where the platform truck may not fit sufficiently close to the baggage car tracks to allow the caster wheels to pass on and off the different vehicles without dropping between.

In operation the platform truck 20 is movable alongside the car on the track 26 on the station platform 28, to a point opposite the discharge door 13, through which the movable truck 16 containing the outgoing baggage is to be discharged. The baggage man in the car has loaded the truck 16 with whatever baggage or packages are to be discharged at any intermediate station, and has the truck on the track 14 ready to be pushed out of the car as soon as the train comes to a stop and the platform truck is moved into place. The truck 16 is discharged from the baggage car onto the platform truck 20. The platform truck is moved longitudinally of the car to bring the truck 16 containing the outgoing baggage into register with the tracks 14 in the car, when said truck is pushed into the car in place of one discharged therefrom. The Y 14ª on each track enables the loading truck to be easily moved into place and the casters 17, find the tracks or guideways 14 in the car and from there across the frog plates 15 to the tracks 12, in any part of the car.

It will be observed in Figs. 10 and 11 that I have arranged the platform 28 higher than the track road bed 29, and this height in each instance will be regulated by the height found necessary to accommodate the trucks and the cars with which they are being operated.

The tracks 26 are preferably channel shaped to accommodate the casters on the platform trucks, and extend for a portion of their length parallel with the railroad track 30, extending into the freight house or baggage room 31 which may be located at any convenient place.

I claim:

1. In transfer apparatus of the kind described, the combination of a track or guideway extending longitudinally and transversely of a car, a truck movable on said track and adapted to be discharged at right angles to its line of travel in the car.

2. In transfer apparatus of the kind described, the combination of a channel track or guideway extending longitudinally and transversely of a car, frog plates arranged at the intersection of said tracks, and a truck provided with revoluble members movable in said track and capable of being discharged at a point at right angles to its line of travel in the car.

3. In transfer apparatus of the kind described, the combination of a track extending longitudinally and transversely of a car, frog plates arranged at the intersection of said tracks, said transversely extending tracks terminating in a Y at each end thereof, and a truck provided with rollers movable in said tracks.

4. In transfer apparatus the combination of a track extending longitudinally and transversely of a car, frog plate switches at the intersections of said tracks, a truck movable in said track inside of the car and adapted to be discharged from the car at right angles to its line of travel in the car.

5. In transfer apparatus of the class described, the combination of a track extending longitudinally and transversely of a car, frog plates at the intersections of said tracks and a truck movable on said tracks, with a movable platform truck adapted to register with the door of the baggage car and receive the truck with the discharge baggage and another truck on the platform truck to replace the discharged truck.

6. In transfer apparatus of the kind described, the combination of tracks extending longitudinally and transversely of a car, frog plates at the intersections of said tracks, a truck provided with rollers movable on said tracks to a place of discharge from the car, a platform truck registering with the discharge tracks in the car, said last named truck carrying another truck to replace the one discharged from the car.

7. In transfer apparatus of the class described, the combination of tracks extending longitudinally and transversely of a car, frog plates at the intersections of said tracks, a truck provided with rollers movable in said tracks, with a platform truck adapted to register with the discharge tracks of the car, said latter truck having a leaf or hinged member adapted to form a bridge between said platform truck and the car whereby the truck in the car may be discharged on the platform truck and another truck moved from the platform truck into the car.

In testimony whereof I have signed this specification.

ROBERT C. RUSSELL.